(12) United States Patent
Killilea et al.

(10) Patent No.: US 7,728,068 B2
(45) Date of Patent: *Jun. 1, 2010

(54) COATING COMPOSITIONS CONTAINING REACTIVE DILUENTS AND METHODS

(75) Inventors: T. Howard Killilea, North Oaks, MN (US); James M. Bohannon, High Point, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 855 days.

This patent is subject to a terminal disclaimer.

(21) Appl. No.: 10/994,750

(22) Filed: Nov. 22, 2004

(65) Prior Publication Data

US 2005/0192400 A1 Sep. 1, 2005

Related U.S. Application Data

(63) Continuation-in-part of application No. 10/854,890, filed on May 27, 2004.

(60) Provisional application No. 60/478,070, filed on Jun. 12, 2003.

(51) Int. Cl.
| | |
|---|---|
| C08L 75/00 | (2006.01) |
| C08L 31/00 | (2006.01) |
| C08L 33/00 | (2006.01) |
| C08L 35/00 | (2006.01) |
| C08L 11/02 | (2006.01) |
| C08L 27/00 | (2006.01) |
| C08L 67/00 | (2006.01) |
| C08L 77/00 | (2006.01) |
| C08L 79/00 | (2006.01) |
| C08L 27/12 | (2006.01) |
| C08L 27/04 | (2006.01) |
| C08L 71/02 | (2006.01) |
| C08G 18/08 | (2006.01) |
| C08G 73/10 | (2006.01) |
| C08G 65/32 | (2006.01) |
| C08G 61/02 | (2006.01) |
| C08G 65/00 | (2006.01) |
| C08G 63/91 | (2006.01) |
| C08J 3/00 | (2006.01) |
| C08K 3/20 | (2006.01) |
| C08C 19/08 | (2006.01) |
| C08F 220/18 | (2006.01) |
| C08F 290/14 | (2006.01) |
| C08F 8/00 | (2006.01) |
| C08F 8/14 | (2006.01) |
| C08F 283/00 | (2006.01) |
| C08F 283/04 | (2006.01) |
| C08F 8/30 | (2006.01) |
| C09D 11/10 | (2006.01) |

(52) U.S. Cl. .......... 525/50; 524/507; 524/590; 524/591; 524/833; 524/834; 524/839; 524/840; 524/845; 525/54.4; 525/55; 525/123; 525/191; 525/197; 525/198; 525/199; 525/213; 525/330.1; 525/403; 525/416; 525/418; 525/419; 525/420; 525/437

(58) Field of Classification Search ........... 427/385.5, 427/372.2; 428/423.1; 523/402; 524/507, 524/556, 570, 589, 590, 591, 601, 606, 833, 524/834, 835, 845; 525/123, 455, 50, 54.4, 525/55, 191, 197, 198, 199, 213, 330.1, 403, 525/416, 418, 419, 420, 437
See application file for complete search history.

(56) References Cited

U.S. PATENT DOCUMENTS

| | | |
|---|---|---|
| 3,125,592 A | 3/1964 | Nevin |
| 3,297,745 A | 1/1967 | Fekete et al. |
| 3,373,075 A | 3/1968 | Fekete et al. |
| 3,380,831 A | 4/1968 | Cohen et al. |
| 3,530,100 A | 9/1970 | D'Alelio |
| 3,551,246 A | 12/1970 | Bassemir et al. |
| 3,560,237 A | 2/1971 | Miller |
| 3,567,494 A | 3/1971 | Fitko |
| 3,673,140 A | 6/1972 | Ackerman et al. |
| 3,676,398 A | 7/1972 | D'Alelio |
| 3,700,643 A | 10/1972 | Smith et al. |
| 3,759,809 A | 9/1973 | Carlick et al. |
| 3,876,518 A | 4/1975 | Borden et al. |
| 3,878,077 A | 4/1975 | Borden et al. |
| 3,935,173 A | 1/1976 | Ogasawara et al. |
| 4,906,684 A | 3/1990 | Say |
| 5,026,771 A | 6/1991 | Dupont et al. |
| 5,047,270 A | 9/1991 | Mori et al. |

(Continued)

FOREIGN PATENT DOCUMENTS

DE 44 40 819 A1 5/1995

(Continued)

OTHER PUBLICATIONS

Koleske et al., *Paint and Coatings Industry*, 2003 Additives Guide, Apr. 2003, pp. 12-86.

(Continued)

*Primary Examiner*—Patrick D Niland
(74) *Attorney, Agent, or Firm*—Mueting Raasch & Gebhardt, P.A.

(57) ABSTRACT

The present invention provides coating compositions that include reactive diluents and have high performance, low VOC levels, and low irritation levels.

29 Claims, No Drawings

U.S. PATENT DOCUMENTS

| | | | |
|---|---|---|---|
| 5,089,376 | A | 2/1992 | Setthachayanon |
| 5,290,663 | A | 3/1994 | Huynh-Tran |
| 5,371,148 | A | 12/1994 | Taylor et al. |
| 5,484,849 | A | 1/1996 | Bors et al. |
| 5,543,557 | A | 8/1996 | Bergvall |
| 5,562,953 | A | 10/1996 | Bors et al. |
| 6,048,471 | A | 4/2000 | Henry |
| 6,075,088 | A | 6/2000 | Braeken |
| 6,162,842 | A | 12/2000 | Freche et al. |
| 6,197,844 | B1 | 3/2001 | Hamrock et al. |
| 6,462,127 | B1 | 10/2002 | Ingrisch et al. |
| 6,747,088 | B1 | 6/2004 | Schwalm et al. |
| 6,987,135 | B2 | 1/2006 | Van Den Berg et al. |
| 6,997,980 | B2 | 2/2006 | Wegner et al. |
| 2002/0156145 | A1 | 10/2002 | Van Den Berg et al. |
| 2002/0164434 | A1 | 11/2002 | Tarvin et al. |
| 2003/0228424 | A1 | 12/2003 | Dove et al. |
| 2004/0254293 | A1 | 12/2004 | Killilea et al. |
| 2006/0111503 | A1 | 5/2006 | Killilea et al. |

FOREIGN PATENT DOCUMENTS

| | | |
|---|---|---|
| EP | 0 486 278 A1 | 5/1992 |
| EP | 0 492 847 A2 | 7/1992 |
| EP | 0 492 847 A3 | 2/1993 |
| EP | 0 651 039 A | 5/1995 |
| EP | 0 492 847 B1 | 1/1997 |
| EP | 0 939 109 A1 | 9/1999 |
| EP | 0965621 | 12/1999 |
| EP | 0 492 847 B2 | 11/2002 |
| GB | 1 541 891 | 3/1979 |
| JP | 53-97083 | 8/1978 |
| JP | 57 078468 | 5/1982 |
| JP | 1-168767 | 7/1989 |
| WO | 93/16133 A2 | 8/1993 |
| WO | 93/16133 A3 | 8/1993 |
| WO | 01 27181 A | 4/2001 |
| WO | WO 01/23453 A1 | 4/2001 |
| WO | WO 02/34808 A1 | 5/2002 |
| WO | WO 02/053658 A2 | 7/2002 |
| WO | WO 2004/111143 A2 | 12/2004 |
| WO | WO 2004/111143 A3 | 12/2004 |
| WO | 2006/057875 A1 | 6/2006 |

OTHER PUBLICATIONS

Database WPI Week 198932, Derwent Publications Ltd., London, GB: AN 1989-23274, XP002325321 "Active energy ray cure coating composition" and JP 01 168767 A (Toyo INK) Jul. 4, 1989, Abstract.

Patent Abstracts of Japan. vol. 006, No. 158 (C-120), Aug. 19, 1982, and JP 57 078468 A (Dainippon Printing Co. LTD), May 17, 1982 Abstract.

"Sartomer Company Material Safety Data Sheet- Product SR295" datasheet. Sartomer Company, Inc., Exton, PA, revised: Jul. 27, 2005 (replaces data sheet of Oct. 5, 2004). printed Jul. 27, 2005, 7 pgs.

"Sartomer Safety Data Sheet—CRAYNOR 132" datasheet. Cray Valley, Rieux, France, version: Jul. 15, 2002 (supersedes datasheet of Dec. 1, 1999). printed Aug. 4, 2005, 5 pgs.

U.S. Appl. No. 10/854,890, filed May 27, 2004, Killilea et al.

Product Data Sheet, Alberdingk Boley, Inc., Greensboro, N.C., Alberdingk®LUX 399 UV-Dispersion, Published Aug. 22, 2002, 2 pgs.

Safety Data Sheet, Alberdingk Boley, Inc., Greensboro, N.C., Alberdingk®LUX 399 UV-Dispersion, Published May 19, 2004, 4 pgs.

Australian Office Action dated Apr. 9, 2009 for Australian Patent Application No. 2004248127; 4 pgs.

European Office Action dated Sep. 15, 2009 for European Patent Application No. 04 753 568.7—1214; 5 pgs.

European Office Action dated Feb. 7, 2007 for European Patent Application No. 04 753 568.7—1214; 4 pgs.

Extended European Search Report and Written Opinion dated Jun. 17, 2009 for European Patent Application No. 08152255.9-1214; 6 pgs.

U.S. Appl. No. 11/281;167; filed Nov. 17, 2005, Killilea et al.

Draize et al., "Methods for the Study of Irritation and Toxicity of Substances Applied Topically to the Skin and Mucous Membranes," *J. Pharmacol. Exp. Ther.*, 1944; 82(3):377-390.

"Draize test," Wikipedia [online]. [retrieved on Oct. 22, 2008]. <URL:http://en.wikipedia.org/wiki/Draize_test>; 6 pgs. (Page last modified Oct. 5, 2008).

"Trimethylolpropane trimethacrylate," datasheet [online]. chemBlink Inc., Cary, NC, ©2008 [retrieved on Oct. 21, 2008]. Retrieved from the Internet:<URL:http://www.chemblink.com/products/3290-92-4.htm>; 2 pgs.

U.S. Federal Register, vol. 60, No. 116, Jun. 16, 1995, pp. 31633-31637.

U.S. Appl. No. 60/478,070, filed Jun. 12, 2003, Killilea et al.

European Office Action dated Sep. 15, 2008 for European Patent Application No. 04 753 568.7-1214; 5 pgs.

COATING COMPOSITIONS CONTAINING REACTIVE DILUENTS AND METHODS

CROSS-REFERENCE TO RELATED APPLICATIONS

The present application is a Continuation-In-Part of U.S. patent application Ser. No. 10/854,890, filed on May 27, 2004, and claims priority to U.S. Provisional Application No. 60/478,070, filed on Jun. 12, 2003, which are incorporated herein by reference in their entirety.

BACKGROUND

There is a significant need for lower VOC-containing (volatile organic compound-containing) systems in the coatings industry due to increasing environmental restrictions. Typically, lower VOC-containing systems have been achieved by using lower molecular weight polymers. However, this can result in products having poorer performance.

In an effort to reduce the amount of VOC's released, and maintain performance, manufacturers have been using water-based polyurethanes. Such water-based polyurethanes are usually linear polymers and produce films that have chemical resistance lower than the highly crosslinked films of solvent-borne urethane systems. Preparing the polyurethane coating compositions by pre-crosslinking a water-based polyurethane polymer can be accomplished by incorporating a large amount of monomers that have more than two reactive functional groups in the prepolymer stage. However, this results in highly viscous prepolymer blends that cannot be easily dispersed in water. Diluents have been used to address this problem of viscosity, but many are highly irritating either to skin, eyes, or both. In many instances the presence of an "irritating" diluent will require that extensive industrial hygiene measures be undertaken before using the product. However, such measures may not be practical and such products may not be selected as a result.

Thus, what is needed are coating compositions that have high performance, low VOC levels, and low irritation levels.

SUMMARY

The present invention provides coating compositions that include reactive diluents and have high performance, low VOC levels, and low irritation levels. Certain embodiments of the present invention include water and water-dispersible polymers and other embodiments do not include water.

Preferred water-dispersed coating compositions include no more than seven weight percent (wt-%) (more preferably no more than 4 wt-%) volatile organic compounds (VOC), based on the total weight of the composition. However, certain other compositions, e.g., alkyd-based compositions, may contain higher VOC levels.

In one embodiment, a coating composition is provided that includes: a water-dispersible polymer (e.g., polyurethanes, epoxies, polyamides, chlorinated polyolefins, acrylics, oil-modified polymers, polyesters, and mixtures or copolymers thereof); a substantially non-irritating reactive diluent that includes a compound having a molecular weight of at least 350 grams/mole (preferably a molecular weight of 350 grams/mole to 1000 grams/mole); and water. The reactive diluent: is substantially free of ethylene oxide moieties, propylene oxide moieties, and primary hydroxyl functionality, has an average ethylenically unsaturated functionality of at least 3.0, and has a viscosity at 25° C. of no greater than 2,000 cps. Furthermore, such compositions preferably do not include a latex polymer.

If the reactive diluent is provided as a mixture of compounds, the mixture as a whole is substantially non-irritating. That is, the phrase "reactive diluent" can encompass one or more compounds. If it is a mixture of compounds, the entire mixture must be substantially nonirritating.

In another embodiment, a coating composition is provided that includes an oil-modified polymer (e.g., an alkyd, an oil-modified polyurethane, oil-modified epoxy, oil-modified polyamide, oil-modified acrylics, and mixtures or copolymers thereof); and a substantially non-irritating reactive diluent that includes a compound having a molecular weight of at least 350 grams/mole (preferably a molecular weight of 350 grams/mole to 1000 grams/mole). The substantially non-irritating reactive diluent: is substantially free of ethylene oxide moieties, propylene oxide moieties, and primary hydroxyl functionality, has an average ethylenically unsaturated functionality of at least 3.0, and has a viscosity at 25° C. of no greater than 2,000 cps. The oil-modified polymer is water-dispersible for certain embodiments. If the reactive diluent is provided as a mixture of compounds, the entire mixture is substantially non-irritating.

Typically, the water-dispersible polymer includes amine or acid functionality. It can also include ethylenic unsaturation (e.g., (meth)acrylate functionality or auto-oxidative carbon-carbon double bonds).

The reactive diluent can include a (meth)acrylate (wherein "(meth)acrylate" refers to an acrylate and a methacrylate), a vinyl ether, a (meth)allyl ether (wherein (meth)allyl ether refers to an allyl ether and a methallyl ether), or mixtures or copolymers thereof. Preferably, the reactive diluent includes a (meth)acrylate-functional compound, such as those selected from the group consisting of di-(trimethylolpropane tetraacrylate), di-(trimethylolpropane tetramethacrylate), and mixtures thereof.

The present invention also provides methods for coating that involve applying a coating composition to a substrate and allowing the coating composition to harden. The present invention also provides coatings prepared or preparable from the coating compositions described herein. For example, a coating of the present invention is preparable by a method that involves applying a coating composition of the present invention to a substrate and allowing the coating composition to harden.

The present invention also provides a method of preparing a coating composition, the method involves: providing a mixture that includes a water-dispersible polymer and a substantially non-irritating reactive diluent having a viscosity below 100,000 centipoise (cps) at processing or use temperatures, wherein the reactive diluent has a molecular weight of at least 350 grams/mole; and dispersing the mixture in water. The reactive diluent: is substantially free of ethylene oxide moieties, propylene oxide moieties, and primary hydroxyl functionality, has an average ethylenically unsaturated functionality of at least 3.0, and has a viscosity at 25° C. of no greater than 2,000 cps. Significantly, because of the use of the reactive diluent, this process does not require the need for added solvent.

In another embodiment, the present invention provides a method of preparing a coating composition that includes: mixing water, a surfactant, and a substantially non-irritating reactive diluent, wherein the reactive diluent: has a molecular weight of at least 350 grams/mole, is substantially free of ethylene oxide moieties, propylene oxide moieties, and primary hydroxyl functionality, has an average ethylenically unsaturated functionality of at least 3.0, and has a viscosity at 25° C. of no greater than 2,000 cps; and blending this mixture with a water-dispersible polymer and water.

As used herein, a "reactive diluent" includes one or more relatively low molecular weight compounds that react with at least one of the following: a polymer (e.g., a water-dispersible polymer such as a polyurethane), itself, another reactive diluent, or any combination of these; a reactive diluent can form an interpenetrating network with the polymer or can crosslink with the polymer; and can be a monomer, oligomer, or polymer.

Also herein, "water-dispersible" means the polymer is itself capable of being dispersed into water (i.e., without requiring the use of a separate surfactant) or water can be added to the polymer to form a stable dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization; however, these are not considered secondary emulsifying agents (e.g., surfactants) used to disperse a water insoluble latex polymer.

As used here, a "latex" polymer means the polymer itself is not capable of being dispersed in water; rather, a latex polymer requires a secondary emulsifying agent (e.g., a surfactant) for creating an emulsion of polymer particles in water. Also herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

Also herein, the terms "comprises" and variations thereof do not have a limiting meaning where these terms appear in the description and claims.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Coating compositions of the present invention include a reactive diluent and either a water-dispersible polymer or an oil-modified polymer, which can be water-dispersible or not. When combined with the polymer, the reactive diluent is capable of providing a low VOC-containing composition.

Preferably, the method of preparing a coating composition, involves: providing a mixture that includes a water-dispersible polymer and a reactive diluent having a viscosity below 100,000 centipoise (cps) at processing or use temperatures.

Preferably, coating compositions of the present invention have a viscosity below 100,000 cps, more preferably below 30,000 cps, even more preferably below 15,000 cps, even more preferably below 5,000 cps, and most preferably below 1,000 cps at processing or use conditions.

Preferably, the coating compositions include no more than 7 weight percent (wt-%) volatile organic compounds. More preferably, the coating compositions of the present invention include no more than 4 wt-% volatile organic compounds. Volatile organic compounds are defined in U.S. Pat. No. 6,048,471 (Henry) and in the U.S. Federal Register: Jun. 16, 1995, volume 60, number 111.

Coating compositions of the present invention preferably include a reactive diluent in an amount of at least 5 weight percent (wt-%), more preferably at least 10 wt-%, and most preferably at least 15 wt-%, based on the combined weight of the reactive diluent and the polymer component of the composition. Coating compositions of the present invention preferably include a reactive diluent in an amount of no more than 40 weight percent (wt-%), more preferably no more than 30 wt-%, and most preferably no more than 25 wt-%, based on the combined weight of the reactive diluent and the polymer component of the composition.

Water-dispersed coating compositions of the present invention preferably include at least 40 wt-% water, based on the total weight of the composition. Water-dispersed coating compositions of the present invention preferably include no more than 80 wt-% water, and more preferably no more than 70 wt-%, based on the total weight of the composition.

The coating compositions of the present invention may be applied to a variety of substrates including wood, cement, cement fiber board, tile, metal, plastic, glass, optical fibers, and fiberglass. Coating compositions can be applied to a substrate by a variety of methods known to those skilled in the art. Such methods include spraying, painting, rollcoating, brushing, fan coating, curtain coating, spreading, air knife coating, die-coating, vacuum coating, spin coating, electrodeposition, and dipping. The thickness of the coatings will vary with the application. Typically, the coatings will have a thickness of 0.1 to 20 mils (0.00025 to 0.0508 centimeters (cm)), however, thicker or thinner coatings are also contemplated depending on, for example, the desired coating properties.

Compounds that function as reactive diluents are of relatively low molecular weight and can be reactive monomers, oligomers, or low molecular weight polymers. A compound that can function as a reactive diluent is one that can react with at least one of the polymer (the water-dispersible polymer or oil-modified polymer), itself, another reactive diluent, or all of these. The polymer and reactive diluent can form, for example, an interpenetrating network. Alternatively, the reactive diluent can participate in crosslinking the polymer.

Suitable reactive diluent compounds have a relatively low molecular weight. Preferably, suitable reactive diluent compounds have a molecular weight of at least 350 grams/mole (g/mol). Preferably, the molecular weight is no more than 1000 g/mol.

Preferred reactive diluents are also substantially non-irritating, more preferably essentially non-irritating, and most preferably completely non-irritating. If the reactive diluent is provided as a mixture of compounds, the entire mixture is substantially non-irritating, preferably essentially non-irritating, and more preferably completely non-irritating.

A "substantially non-irritating" diluent has a Draize rating of no more than 1 for skin (on a scale of 0 to 8) and no more than 10 for eyes (on a scale of 0 to 110). An "essentially non-irritating" diluent has a Draize rating of no more than 0.5 for skin and no more than 5 for eyes. A "completely non-irritating" diluent has a Draize rating of no more than 0.1 for skin and no more than 3 for eyes.

Preferred reactive diluents are substantially free of ethylene oxide moieties, propylene oxide moieties, and primary hydroxyl functionality. More preferably, they are essentially free of ethylene oxide moieties, propylene oxide moieties, and primary hydroxyl functionality. Most preferably, they are completely free of ethylene oxide moieties, propylene oxide moieties, and primary hydroxyl functionality.

"Substantially free," as it relates to ethylene oxide and propylene oxide moieties, means that less than 5 wt-% ethylene oxide and propylene oxide moieties are present in the reactive diluent. "Essentially free" means that less than 1 wt-% ethylene oxide and propylene oxide moieties are present in the reactive diluent. "Completely free" means that less than 0.5 wt-% ethylene oxide and propylene oxide moieties are present in the reactive diluent.

"Substantially free," as it relates to primary hydroxyl functionality, refers to compounds that have a primary OH-functionality of no more than 30 milliequivalents KOH/gram (meq/g). "Essentially free" of primary hydroxyl functionality refers to compounds that have a primary OH-functionality of no more than 25 milliequivalents KOH/gram (meq/g). "Completely free" of primary hydroxyl functionality refers to compounds that have a primary OH-functionality of no more than 20 milliequivalents KOH/gram (meq/g).

Reactive diluents typically include compounds with ethylenic unsaturation. Preferred ethylenically unsaturated compounds have an average ethylenically unsaturated functionality of at least 3.0, and more preferably at least 4.0. Preferably the average ethylenically unsaturated functionality is no more than 8.0.

Preferably, ethylenically unsaturated compounds have a viscosity at 25° C. of no greater than 2,000 cps. Herein, viscosity is measured by a Brookfield DV-1$^+$ Viscometer and a Number 31 spindle at 1.5 revolutions per minute (rpm).

Suitable such compounds include a (meth)acrylate, a vinyl ether, a (meth)allyl ether, or mixtures or copolymers thereof. Examples of (meth)acrylate-functional reactive diluents include di-(trimethylolpropane tetraacrylate), and di-(trimethylolpropane tetramethacrylate). Examples of vinyl ether reactive diluents include di-trimethylolpropane tetravinyl ether), di-(pentaerythritol hexavinyl ether), and pentaerythritol tetravinyl ether. Examples of (meth)allyl ether reactive diluents include di-(trimethylolpropane tetraallyl ether), di-(trimethylolpropane tetramethallyl ether), di(pentaerythritol hexaallyl ether), di-(pentaerythritol hexamethallyl ether), pentaerythritol tetraallyl ether, and pentaerythritol tetramethallyl ether. Preferred reactive diluent compounds are (meth)acrylate functional, which include acrylate functionality and methacrylate functionality. Preferred reactive diluents include (meth)acrylate functional compounds. Of these, the preferred reactive diluent compounds are di-trimethylolpropane tetraacrylate) and di-(trimethylolpropane tetramethacrylate). Reactive diluents used in coating compositions of the present invention if desired can include mixtures of compounds.

Polymers suitable for the coating compositions of the present invention are either water-dispersible or oil-modified, which can be water-dispersible if desired. Furthermore, certain compositions of the present invention do not include more than 30 wt-% of a latex polymer, and preferably no more than 20 wt-%, more preferably, no more than 10 wt-%, even more preferably no more than 5 wt-%, and even more preferably no detectable amount of a latex polymer, wherein the percentages are based on the total weight of the coating composition. If a latex polymer is included in the composition, in addition to a water-dispersible polymer, the latex polymer is preferably prepared through chain-growth polymerization, using, for example, ethylenically unsaturated monomers (e.g., acrylic acid, methacrylic acid, methyl acrylate, styrene) via an emulsion process. Preferably, such monomers include styrene, preferably in an amount or at least 10 wt-%, more preferably at least 20 wt-%, and preferably in an amount of no greater than 75 wt-%, more preferably no greater than 50 wt-%, based on the total weight of the latex polymer composition (i.e., the components used in making the latex polymer). Such polymers are well-known in the coating industry and include a wide variety of polymers.

The polymers preferably include reactive functionalities that are capable of reacting with the aforementioned reactive diluent(s). One such preferred polymer includes ethylenic unsaturation and, when cured, provides a hard, durable coating. Such ethylenic unsaturation is preferably in the form of (meth)acrylate or auto-oxidative carbon-carbon double bonds.

Suitable water-dispersible polymers include polyurethanes, epoxies, polyamides, chlorinated polyolefins, acrylics, oil-modified polymers, polyesters, and mixtures or copolymers thereof, for example. Such polymers are readily synthesized and made to be water dispersible using conventional techniques. For example, the incorporation of amine or acid functionality produces water dispersibility.

Oil-modified polymers can also be used if desired, whether water dispersible or not. As used herein, oil-modified polymers are broadly defined to include polymers that contain oils and/or oil based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd. Such polymers are readily synthesized and can be made to be water dispersible if desired using conventional techniques.

Water-dispersible polyurethanes are particularly preferred. These polymers may be made in a variety of ways. One suitable method includes reacting one or more isocyanates with one or more hydroxy-functional compounds. Preferred such polymers include ethylenic unsaturation as well as salt-forming functionality. The ethylenic unsaturation can be introduced into a polyurethane, for example, by reacting the aforementioned isocyanate with a hydroxy-functional acrylate, methacrylate, allyl ether, vinyl ether, monoglyceride, diglyceride, an ester polyol, or oil-modified polymers. The preferred oil-modified polymer useful in preparing an ethylenic unsaturated water-dispersible polyurethane is an alkyd. Preferred ethylenically unsaturated polyurethanes include (meth)acrylate or auto-oxidative carbon-carbon double bond functionality.

Suitable isocyanates include diisocyanates, triisocyanates, and other polyisocyanates. Preferred polyisocyanates for practicing the invention are polyisocyanates having 4 to 25 carbon atoms and from 2 to 4 isocyanate groups per molecule. Examples of isocyanates are those conventionally used in making polyurethanes, including aliphatic, cycloaliphatic, aromatic isocyanates, and mixtures thereof.

Suitable hydroxy-functional ethylenically unsaturated compounds for reaction with the isocyanate include hydroxy-functional (meth)acrylates. Examples of suitable hydroxy-functional (meth)acrylates include alkyl and cycloalkyl hydroxy-functional (meth)acrylates, such as 2-hydroxyethyl (meth)acrylates, 3-hydroxypropyl(meth)acrylates, 4-hydroxybutyl(meth)acrylates, 2-hydroxy-2-methylethyl(meth) acrylates, and 4-hydroxycyclohexyl(meth)acrylates, as well as other similar hydroxy-functional aliphatic (meth)acrylates. Other suitable hydroxy-functional (meth)acrylates include hydroxy-functional (meth)acrylate polyesters such as caprolactone 2-((meth)acryloyloxy)ethyl esters, dicaprolactone 2-((meth)acryloyloxy)ethyl esters, and higher molecular weight caprolactone homologues, and hydroxy-functional (meth)acrylate polyethers.

Another type of hydroxy-functional ethylenically unsaturated compound for use in making polyurethanes is a hydroxy-functional (meth)allyl ether. Suitable hydroxy-functional (meth)allyl ethers include at least one hydroxyl group and one or more allyl ether groups, such as hydroxyethyl allyl ether, hydroxypropyl allyl ether, trimethylolpropane monoallyl ether, trimethylolpropane diallyl ether, trimethylolethane monoallyl ether, trimethylolpropane dimethallyl ether, and the like.

Vinyl ethers may also be utilized in making ethylenically unsaturated polyurethanes. A suitable vinyl ether compound includes at least one hydroxyl group and one or more vinyl ether groups. Examples of suitable vinyl ethers include 4-hydroxybutyl vinyl ether, cyclohexanedimethanol monovinyl ether, ethylene glycol monovinyl ether, diethylene glycol monovinyl ether, and the like.

Ethylenic unsaturation can also be incorporated into a polyurethane via reaction with an ester polyol made by reaction of an aromatic or aliphatic polyol containing at least two hydroxyl groups per molecule with a fatty acid wherein a portion of the fatty acid contains auto-oxidative carbon-carbon double bonds. Suitable polyols include ethylene glycol, ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof. Suitable unsaturated fatty acids include linoleic, palmitoleic, linolenic, eleostearic, arachidonic, ricinoleic acids, 10,12-octadecadienoic acid, and mixtures thereof.

Polyurethanes containing ethylenic unsaturation can also be developed by utilizing the reaction product formed via transesterification of an oil, containing auto-oxidative carbon-carbon double bonds, with an aromatic or aliphatic polyol containing at least two hydroxyl groups per molecule. Suitable oils include linseed oil, soybean oil, safflower oil, tall oil, sunflower oil, dehydrated caster oil, castor oil, ricine oil, tung oil, sardine oil, olive oil, cottonseed oil and mixtures thereof. Suitable polyols include ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

Oil-modified polymers, preferably, hydroxyl-functional alkyds can also be used to develop ethylenic unsaturated polyurethanes. Alkyds can be prepared by any method known in the art. An example of a method to prepare an alkyd includes the transesterification of an oil and polyol with a further reaction with polybasic acids and optionally, further polyols. In addition, polybasic acids and fatty acids can be reacted with polyols in suitable proportions. The reaction of the polyols with polybasic acids and fatty acids and/or oils can be catalyzed by transesterification catalysts such as calcium naphthenate, lithium neodecanoate, zinc acetate, tin oxide and the like. A color stabilizer such as trisnonyl phenyl phosphite may also be added.

Suitable oils and/or fatty acids derived therefrom that are useful in making an alkyd or other oil-modified polymer include compounds such as, for example, linseed oil, safflower oil, tall oil, cotton seed oil, ground nut, wood oil, tung oil, ricine oil, sunflower oil, soya oil, castor oil, dehydrated castor oil, coconut oil, sardine oil, olive oil, and the like. These oils and/or fatty acids can be used alone or as a mixture of one or more of the oils and/or fatty acids.

Suitable polyols useful in making an alkyd include compounds such as, for example, aliphatic, cycloaliphatic and/or araliphatic alcohols having 1 to 6, preferably 1 to 4, hydroxy groups attached to nonaromatic or aromatic carbon atoms, such as, for example, ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol. These compounds can be used alone or as a mixture of one or more polyols.

Suitable polybasic acids useful in making an alkyd include compounds such as, for example, aliphatic, cycloaliphatic saturated or unsaturated and/or aromatic polybasic carboxylic acids, such as, for example, dicarboxylic, tricarboxylic, and tetracarboxylic acids. Polybasic acids are broadly defined to include anhydrides of the polybasic acids such as, for example, maleic anhydride, phthalic anhydride, succinic anhydride, tetrahydrophthalic anhydride, hexahydrophthalic anhydride, trimellitic anhydride, or mixtures thereof. These compounds can be used alone or as a mixture of one or more polybasic acids.

Alkyds can also be prepared by reacting polybasic acids with a compound containing an amine to provide an amide containing alkyd. Examples of suitable amines include ethylene diamine, diethylene triamine, triethylene tetra amine, and melamine 1,2-diamino propane, 1,3-diamino propane, and the like; or amino alcohols such as, for example, 2-amino-propan-1-ol, 3-amino-propan-1-ol, dimethylisopropanolamine, 2-amino-2-methyl-1-propanol, dimethylethanolamine, and the like. These amide containing alkyds can be designed to be amine and/or hydroxy functional and subsequently could be useful in making a water dispersible polyurethane polymer.

Conventionally, to facilitate manufacture, the polyurethane prepolymer can be made in the presence of a solvent that is either left in the dispersion, or removed as one of the last steps in production to provide a low solvent or solvent-free product. Solvents that can be easily removed, are usually volatile solvents, such as acetone or methyl ethyl ketone. In place of such solvents (or a portion of such solvents), however, one or more reactive diluents as described above are used.

Chain extenders can also be used in the preparation of urethane polymers. Examples of chain extenders include an alkyl amino alcohol, cycloalkyl amino alcohol, heterocyclic amino alcohol, polyamine (e.g., ethylene diamine, diethylene triamine, etc.), hydrazine, substituted hydrazine, hydrazide, amide, water or mixtures thereof.

In general, for water dispersibility, acid salt forming groups can be introduced into the polymer by a number of methods. For example, a water-dispersible polyurethane can be made by reacting a suitable compound (e.g., a polyisocyanate) with a compound containing active hydrogen and active acid groups neutralized by a neutralizing base. Suitable compounds having active hydrogen and active acid groups include hydroxy and mercapto carboxylic acids, aminocarboxylic acids, aminohydroxy carboxylic acids, sulfonic acids, hydroxy sulfonic acids, and aminosulfonic acids. Suitable neutralizing bases include inorganic bases such as sodium hydroxide, potassium hydroxide, lithium hydroxide, ammonia, triethylamine, and dimethyl ethanol amine.

Alternatively, for water dispersibility, basic salt forming groups can be introduced into the polymers by reacting a suitable compound (e.g., a polyisocyanate) with a compound containing active hydrogen groups and active basic groups neutralized with an acid. Suitable compounds having active hydrogen groups and active basic groups include aliphatic, cycloaliphatic and heterocyclic amino alcohols, diols and triols, amines, diamines, triamines, tetramines, and amides. Suitable neutralizing acids include organic acids such as formic acid and acetic acid, and inorganic acids such as hydrochloric acid and sulfuric acid.

For example, urethanes can be made water-dispersible by incorporating amine or acid functionality. For example, water-based anionically stabilized polyurethane polymers are prepared by reacting polyols and dihydroxy carboxylic acid compounds with an excess of diisocyanate to provide a carboxylic acid functional prepolymer having NCO terminal groups. The acid groups can be neutralized with tertiary amines to provide salt groups. The neutralized prepolymer can be readily dispersed in water. Alternatively, the anionic stabilizing group of the water-dispersible polyurethane polymers can be replaced with cationic stabilizing groups or nonionic stabilizing groups, to facilitate water dispersibility.

Suitable additives for use in coating compositions of the present invention are described in Koleske et al., *Paint and Coatings Industry*, April, 2003, pages 12-86.

Certain embodiments of the present invention, particularly those with (meth)acrylate functional groups in the polymers and/or reactive diluents of the coating compositions, include polymers that are curable by UV or visible light. These coating compositions typically include a free-radical initiator, particularly a photoinitiator that induces the curing reaction upon exposure to light. The photoinitiator makes up about 0.1-10 wt-% of the coating composition.

Among photoinitiators suitable for use in the present invention with resins having (meth)acrylate or allyl ether functional groups are alpha-cleavage type photoinitiators and hydrogen abstraction type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxy-cyclohexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as that commercially available under the trade designation ESCACURE TZT from Fratelli-Lamberti, sold by Sartomer, Exton, Pa.,), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. A particularly preferred initiator mixture is commercially available under the trade designation IRGACURE 500 from Ciba Corp., which is a mixture of IRGACURE 184 and benzophenone, in a 1:1 ratio. This is a good example of a mixture of an alpha-cleavage type photoinitiator and a hydrogen abstraction-type photoinitiator. Other mixtures of photoinitiators may also be used in the coating compositions of the present invention. Camphorquinone is one example of a suitable photoinitiator for curing a coating composition with visible light.

A coating composition of the present invention can also include a coinitiator or photoinitiator synergist. The coinitiators can be tertiary aliphatic amines (such as methyl diethanol amine and triethanol amine), aromatic amines (such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB RadCure Specialties). Combinations of the above categories of compounds may also be used.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

Many coating compositions that may be cured by UV or visible light may also be cured with an electron beam. Techniques and devices for curing a coating composition using an electron beam are known in the art. These techniques do not require a photoinitiator for electron beam cure of the coating.

Coating compositions having polymer resins with (meth)acrylate and/or allyl functional groups may also be thermally cured using a suitable initiator. The thermal initiator typically facilitates the curing process by a free radical mechanism and typically includes a peroxide or azo compound. Peroxide compounds suitable for use as initiators in the coating compositions of the present invention include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, and di-(2-ethylhexyl)-peroxydicarbonate. Suitable azo compounds which may be employed as an initiator in the present compositions include 2,2-azo bis-(2,4-dimethylpentane-nitrile), 2,2-azo bis-(2-methylbutanenitrile), and 2,2-azo bis-(2-methylpropanenitrile).

For coating compositions having a mixture of (meth)acrylate, allyl ether, and vinyl ether functional groups, a combination of curing procedures may be used. For example, a coating composition having a resin with both (meth)acrylate and vinyl ether functional groups typically includes an alpha-cleavage type and/or hydrogen abstraction type photoinitiator for the (meth)acrylate groups and a cationic-generating photoinitiator for the vinyl ether groups.

Other methods for curing the coating compositions of the invention can be used alone or in combination with methods described hereinabove. Supplemental curing methods include heat cure, chemical cure, anaerobic cure, moisture cure, oxidative cure, and the like. Each method of cure requires a corresponding curing initiator or curing agent, which is included in the composition. For example: heat cure can be induced by peroxides; metal drier packages can induce an oxidative cure; multifunctional amines (for example isophorone diamine) can effect a chemical crosslinking cure through Michael addition of amine groups onto acrylate reactive unsaturated groups. If these additional initiators are present in the coating composition they typically make up 0.1-12% by weight of the curable coating composition.

Means for effecting cures by such methods are known to those of skill in the art or can be determined using standard methods.

Certain coating compositions of the invention also can include metal driers. Typical driers include, for example, cobalt, manganese, lead, zirconium, calcium, cerium, lanthanum, and neodymium salts or combinations thereof. Metal driers can be used in combination with accelerators for certain embodiments. For example, water-dispersible polyurethane-polyethylene compositions can also include compounds such as, for example, 1,10-phenanthroline, bipyridine, and the like, which function as accelerators in combination with the metal driers.

Certain coating compositions of the present invention may also include one or more of a group of ingredients that can be called performance enhancing additives. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

Coating compositions of the present invention may also include ultraviolet-light (UV) absorbers and hindered amine light stabilizers (HALS), either individually or as blends. Suitable UV absorbers and HALS are known to those skilled in the art or can be determined using standard methods. Exemplary UV absorbers include, Tinuvin 292 and Tinuvin 1130 (Ciba-Geigy) and Fadex JM (Clariant). Suitable examples of HALS include, Tinuvin 152 and Tinuvin 292 (Ciba-Geigy). Commercial blends of UV absorbers and HALS such as Sanduvor TB-02 (Clariant) may also be used.

Coating compositions may include a surface-active agent that modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. The surface active agent may make up 0-5% by weight of the curable coating composition.

Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306, BYK 333, and BYK 346 from Byk-Chemie, Wallingford, Conn.) and fluorinated surface active agents (such as that commercially available as FLUORAD FC-430 from 3M Co., St. Paul, Minn.). The surface active agents may include a defoamer. Suitable defoamers include polysiloxane defoamers (such as a methylalkylpolysiloxane like that commercially available under the trade designation BYK 077 or BYK 500 from Byk-Chemie) or polymeric defoamers (such as that commercially available under the trade designation BYK 051 from Byk-Chemie).

For some applications, a coating that is opaque, colored, pigmented or has other visual characteristics is desired. Agents to provide such properties can also be included in coating compositions of the present invention. Pigments for use with the present invention are known in the art. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow). The composition can also include a gloss control additive or an optical brightener, such as that commercially available under the trade designation UVITEX OB from Ciba-Geigy.

In certain embodiments it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients can make up from 0.1-40% by weight of the coating composition.

The invention may also include other ingredients that modify properties of the curable coating composition as it is stored, handled, or applied, and at other or subsequent stages. Waxes, flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The present invention also provides a method of preparing a coating composition, the method involves: providing a mixture that includes a water-dispersible polymer and a substantially non-irritating reactive diluent having a viscosity below 100,000 centipoise (cps) at processing or use temperatures, wherein the reactive diluent has a molecular weight of at least 350 grams/mole; and dispersing the mixture in water. The reactive diluent: is substantially free of ethylene oxide moieties, propylene oxide moieties, and primary hydroxyl functionality, has an average ethylenically unsaturated functionality of at least 3.0, and has a viscosity at 25° C. of no greater than 2,000 cps. Significantly, because of the use of the reactive diluent, this process does not require the need for added solvent.

In another embodiment, the present invention provides a method of preparing a coating composition that includes: mixing water, a surfactant, and a substantially non-irritating reactive diluent, wherein the reactive diluent: has a molecular weight of at least 350 grams/mole, is substantially free of ethylene oxide moieties, propylene oxide moieties, and primary hydroxyl functionality, has an average ethylenically unsaturated functionality of at least 3.0, and has a viscosity at 25° C. of no greater than 2,000 cps; and blending this mixture with a water-dispersible polymer and water.

EXAMPLES

Objects and advantages of this invention are further illustrated by the following examples, but the particular materials and amounts thereof recited in these examples, as well as other conditions and details, should not be construed to unduly limit this invention.

The following abbreviations have been used herein:
DMPA—Dimethylolpropionic acid (GEO, Allentown, Pa.)
DiTMPTA—Di-trimethylolpropane tetraacrylate (Sartomer, Exton, Pa.)

4-HBA—4-Hydroxy butylacrylate (Aldrich, Milwaukee, Wis.)

TMP—Trimethylol Propane (Aldrich)

DESMOPHEN S-105-110—Polyester diol (Bayer, Pittsburgh, Pa.)

TEA—Triethyl Amine (Aldrich)

DBTDL—Dibutyl Tin Dilaurate (Air Products, Allentown, Pa.)

Example 1

Preparation of (meth)acrylate Functional Polyurethane Dispersion (PUD) with DiTMPTA Reactive Diluent A reactor was charged with 96.0 parts DiTMPTA, 48.0 parts 4-HBA, 91.4 parts DESMOPHEN S-105-110 polyester diol, 29.3 parts DMPA, 9.6 parts TMP, 258.9 parts isophorone diisocyanate, and 500 ppm of 2,6 di-tert-butyl-4-methylphenol. The reaction mixture was heated to 80° C. under an air sparge, where upon 250 ppm DBTDL was added and the reaction processed until the isocyanate level was below 9.2%. The urethane polymer was cooled to 65° C. and then neutralized with 22.1 parts TEA. The urethane polymer viscosity at 65° C. was 6,000 centipoise (cps) as measured by a Brookfield DV-I+ Viscometer and a Number 31 spindle at 1.5 revolutions per minute (RPM).

At a process temperature of 65° C., the (meth)acrylate urethane polymer formed above was then dispersed into 895.5 parts room temperature deionized water and subsequently chain extended with 51.1 parts hydrazine (35% in water). The dispersion was then adjusted to 35% solids with deionized water.

The physical properties of the chain extended (meth)acrylate functional polyurethane dispersion were as follows (NVM %=nonvolatile material by weight):

|  | EXAMPLE 1 |
| --- | --- |
| NVM % | 35% |
| % VOC | 1.4% (TEA) |

Example 2

UV Curable Coating Composition with DiTMPTA Containing (meth)acrylate Functional PUD Under agitation to a stainless steel mixing vessel was added 85 parts of the dispersion from Example 1, 0.85 part IRGACURE 500 from Ciba, 8.05 parts deionized water, 5.00 parts DOWANOL DPM from Dow Chemical, 1.00 part SURFYNOL 104PA from Air Products, and 0.10 part BYK 333 from BYK Chemie. A 3-mil thick (0.00762-cm) wet film was then applied to a Leneta Form 7B test chart and air dried for 15 minutes followed by force dry for 5 minutes at 65° C. The dried (meth)acrylate polymer film was then cured by mercury ultraviolet lamps. Total UV exposure was 1000 millijoules per square centimeter ($mj/cm^2$).

Performance properties are outlined below. Gloss is reported in accordance with ASTM test specification, D-523. All other cured film properties are reported on a scale of 1-10, with 10 being no effect or best.

| TEST | RESULT |
| --- | --- |
| Gloss 60 degree measurement | 88-90 |
| 1 hour Exposure to mustard | 9+ |
| 1 hour exposure to 100 proof vodka | 9 |
| 100 MEK double rubs | 9 |
| 180 degree flexibility | 10 |
| Fingernail mar | 10 |

Gloss measurement was performed with a Micro-Gloss 60 from BYK Gardner in accordance with ASTM test method D-523.

1-Hour spot test exposure to 100 proof vodka and to mustard were performed in accordance with ASTM test method D-1308.

MEK double rub testing was performed in accordance with ASTM test method D-5402.

180-Degree flexibility was performed by bending the test chart 180 degrees around a ½ inch (1.27 cm) diameter rod and visually looking for film cracking.

Fingernail mar was performed by rubbing the back of the fingernail softly across the cured coating and looking for surface mar.

Example 3

Preparation of a Water Dispersible Polyurethane Acrylic Hybrid

A water dispersible polyurethane polymer is prepared by reacting 13.3 parts DMPA and 127.2 parts DESMOPHEN S-107 (55 OH#) with 64.8 parts isophorone diisocyanate in the presence of 92.3 parts methyl methacrylate (MMA) and 200 ppm 2,6 di-tert-butyl-4-methylphenol under an air sparge. The mixture is heated to 85° C. under an air sparge, where upon 200 ppm DBTDL is added and the reaction processed until the isocyanate level is below 3.7%. The urethane polymer is then cooled to 65° C. and 10 parts triethyl amine is added. After a 10-minute hold time at 65° C., the urethane polymer is then dispersed into 540 parts 10° C. deionized water and subsequently chain extended with 11.2 parts hydrazine (35% in water). This mixture is held for 30 minutes and 47.1 parts butyl acrylate (BA) is then added. The free radical polymerization of the MMA and BA is conducted using a redox initiation system of t-butyl hydroperoxide (70% solution in water) (0.9 part) diluted with 33 parts of deionized water and isoascorbic acid (0.45 part) diluted with 34 parts of deionized water. The isoascorbic acid solution is neutralized with aqueous ammonia to a pH of 7-8 and added to the polyurethane dispersion. The t-butyl hydroperoxide solution is added dropwise to the dispersion over 30 minutes under a nitrogen atmosphere. A catalytic level of Hamp-ol 4.5% iron catalyst (supplied by W. R. Grace, Nashua, N.H.) is added to the dispersion just prior to the isoascorbic acid addition. The resulting polyurethane dispersion is then adjusted to 35% solids with deionized water.

Example 4

Preparation of UV/EB Curable Water Dispersed Polyurethane Coating

Under agitation to a stainless steel mixing vessel is added 20 parts deionized water, 3 parts of Rhodapon UB, and 40 parts DiTMPTA. The mixture is blended until a preemulsion forms.

Under agitation, to a stainless steel mixing vessel is added 1000 parts of polyurethane dispersion from Example 3, 50 parts deionized water, and 63 parts of the DiTMPTA preemulsion prepared above. This mixture is then held under agitation for 8 hours until the DiTMPTA migrates into the water-dispersed polyurethane. Twelve (12) parts of IRGACURE 500 is then added to the mixture and held under agitation for another 15 minutes. The mixture is then left overnight to allow the release of any entrapped air. The resulting mixture is substantially non-irritating and will cure to a hard, chemically resistant finish upon exposure to ultraviolet light. The resulting mixture will also cure to a hard, chemically resistant finish without the need of photo initiator under electron beam radiation.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed:

1. A method of preparing a coating composition, the method comprising:
    providing a mixture comprising a water-dispersible polymer and a substantially non-irritating reactive diluent;
    wherein the water-dispersible polymer is prepared in the presence of the reactive diluent;
    wherein the mixture has a viscosity below 100,000 centipoise at processing temperatures;
    wherein the reactive diluent:
        includes a compound having a molecular weight of 350 grams/mole to 1000 grams/mole and having a viscosity at 25° C. of no greater than 2,000 cps;
        is substantially free of ethylene oxide moieties, propylene oxide moieties, and primary hydroxyl functionality;
        has an average ethylenically unsaturated functionality of at least 3.0;
        is present in an amount of 5 wt-% to 40 wt-%, based on the total weight of the reactive diluent and the water-dispersible polymer; and dispersing the mixture in water.

2. A method of preparing a coating composition, the method comprising:
    mixing water, a surfactant, and a substantially non-irritating reactive diluent, wherein the reactive diluent:
        includes a compound having a molecular weight of 350 grams/mole to 1000 grams/mole and having a viscosity at 25° C. of no greater than 2,000 cps,
        is substantially free of ethylene oxide moieties, propylene oxide moieties, and primary hydroxyl functionality,
        has an average ethylenically unsaturated functionality of at least 3.0,
        is present in an amount of 5 wt-% to 40 wt-%, based on the total weight of the reactive diluent and the water-dispersible polymer; and
    blending this mixture with a water-dispersible polymer and water; wherein the water-dispersible polymer is prepared in the presence of the reactive diluent.

3. The method of claim 1 wherein the method includes chain extending the water-dispersible polymer after dispersing it in water with the reactive diluent.

4. The method of claim 2 wherein the method includes chain extending the water-dispersible polymer after blending it in water and the mixture with the reactive diluent.

5. The method of claim 1 wherein the water-dispersible polymer is selected from the group consisting of polyurethanes, epoxies, polyamides, chlorinated polyolefins, acrylics, oil-modified polymers, polyesters, and mixtures or copolymers thereof.

6. The method of claim 5 wherein the water-dispersible polymer is a water-dispersible polyurethane.

7. The method of claim 6 wherein the water-dispersible polyurethane comprises amine or acid functionality.

8. The method of claim 6 wherein the water-dispersible polyurethane comprises ethylenic unsaturation.

9. The method of claim 8 wherein the ethylenic unsaturation comprises (meth)acrylate functionality.

10. The method of claim 8 wherein the ethylenic unsaturation comprises auto-oxidative carbon-carbon double bonds.

11. The method of claim 10 wherein the coating composition further comprises a metal drier.

12. The method of claim 1 wherein the reactive diluent comprises a (meth)acrylate, a vinyl ether, a (meth)allyl ether, or mixtures or copolymers thereof.

13. The method of claim 12 wherein the reactive diluent comprises a (meth)acrylate-functional compound.

14. The method of claim 13 wherein the (meth)acrylate-functional compound is selected from the group consisting of di-(trimethylolpropane tetraacrylate), di-(trimethylolpropane tetramethacrylate), and combinations thereof.

15. The method of claim 1 further comprising a free-radical initiator.

16. The method of claim 1 wherein the reactive diluent is present in an amount of 10 wt-% to 30 wt-%, based on the total weight of the reactive diluent and the water-dispersible polymer.

17. The method of claim 1 comprising no more than 7 wt-% volatile organic compounds.

18. The method of claim 1 wherein the reactive diluent comprises a compound selected from the group of di-(trimethylolpropane tetraacrylate), di-(trimethylolpropane tetramethacrylate), di-(pentaerythritol hexamethacrylate), dipentaerythritol hexaacrylate, pentaerythritol tetramethacrylate, di-(trimethylolpropane tetravinyl ether), di-(pentaerythritol hexavinyl ether), pentaerythritol tetravinyl ether, di-(trimethylolpropane tetraallyl ether), di-(trimethylolpropane tetramethallyl ether), di-(pentaerythritol hexaallyl ether), di-(pentaerythritol hexamethallyl ether), pentaerythritol tetraallyl ether, pentaerythritol tetramethallyl ether, and mixtures thereof.

19. The method of claim 1 wherein the water-dispersible polymer is an oil-modified water-dispersible polymer.

20. The method of claim 19 wherein the oil-modified water dispersible polymer is selected from the group consisting of an alkyd, an oil-modified water-dispersible polyurethane, an oil-modified water-dispersible epoxy, an oil-modified water-dispersible polyamide, an oil-modified water-dispersible acrylic, and mixtures or copolymers thereof.

21. The method of claim 20 wherein the oil-modified water-dispersible polymer is an oil-modified water-dispersible polyurethane.

22. The method of claim 20 wherein the oil-modified water-dispersible polymer is an alkyd.

23. The method of claim 19 wherein the reactive diluent comprises a (meth)acrylate, a vinyl ether, a (meth)allyl ether, or mixtures or copolymers thereof.

24. The method of claim 23 wherein the reactive diluent comprises a (meth)acrylate-functional compound.

25. The method of claim 24 wherein the (meth)acrylate-functional compound is selected from the group consisting of di-(trimethylolpropane tetraacrylate), di-(trimethylolpropane tetramethacrylate), and combinations thereof.

26. The method of claim 19 wherein the coating composition further comprises a metal drier.

27. The method of claim 19 wherein the reactive diluent is present in an amount of 10 wt-% to 30 wt-%, based on the total weight of the reactive diluent and the oil-modified water-dispersible polymer.

28. The method of claim 19 comprising no more than 7 wt-% volatile organic compounds.

29. The method of claim 1 wherein the water-dispersible polymer comprises an oil-modified polymer chemically modified to be water-dispersible.

* * * * *